United States Patent [19]
Tripodi et al.

[11] Patent Number: 5,835,325
[45] Date of Patent: Nov. 10, 1998

[54] ELECTRONIC TRIP DEVICE COMPRISING A CORRECTING DEVICE

[75] Inventors: Paul Tripodi, Eybens; Philippe Piney, Villard Bonnot; Didier Fraisse, St. Martin D'Heres; Yves Dupuis, St. Egreve, all of France

[73] Assignee: Merlin Gerin, France

[21] Appl. No.: 57,786

[22] Filed: May 6, 1993

[30] Foreign Application Priority Data

May 12, 1992 [FR] France .................................. 92 05845

[51] Int. Cl.$^6$ ............................................. H02H 3/00
[52] U.S. Cl. ............................................. 361/94; 361/103
[58] Field of Search ............................. 361/93, 94, 95, 361/103

[56] References Cited

U.S. PATENT DOCUMENTS

| | | | |
|---|---|---|---|
| 3,849,706 | 11/1974 | Johnson et al. | 317/27 R |
| 4,360,880 | 11/1982 | Brodie et al. | 364/483 |
| 4,432,031 | 2/1984 | Premerlani | 361/97 |
| 4,879,626 | 11/1989 | Kim | 361/93 |
| 5,224,011 | 6/1993 | Yalla et al. | 361/93 |

FOREIGN PATENT DOCUMENTS

| | | |
|---|---|---|
| 0 302 470 | 8/1989 | European Pat. Off. . |
| WO 81/02496 | 9/1981 | WIPO . |

OTHER PUBLICATIONS

"A Digital Multifunction Protective Relay", Yalla, IEEE Transactions on Power Delivery, vol. 7, No. 1, Jan. 1992, New York, USA, pp. 193–201.

"Computer–Aided Coordination of Overcurrent–Time Protection", SACHS et al., Power Engineering & Automation, vol.7, No. 2, Apr. 1985, Berlin, Germany, pp. 72–76.

*Primary Examiner*—Sally C. Medley
*Attorney, Agent, or Firm*—Parkhurst & Wendel

[57] ABSTRACT

The trip device with an electronic processing unit which gives a tripping order in terms of the rms value of the current measured by current transformers and of the threshold and time delay setpoints. The non-linearity of response of the current transformers is corrected by a device which modifies the current, threshold, or time delay values. These corrected values enable precise trippings to be achieved in compliance with the values of the current flowing in the circuit breaker. The type of correction is adapted to the circuit breaker rating by parameters obtained by tests and previously stored in a device.

10 Claims, 7 Drawing Sheets

ELECTRONIC TRIP DEVICE COMPRISING A CORRECTING DEVICE

BACKGROUND OF THE INVENTION

The invention relates to an electronic trip device comprising means for measuring the current flowing in conductors to be protected by an electrical circuit breaker associated with the trip device, means for determining thresholds and time delays, and a first electronic processing unit connected to the measuring and determining means in such a way as to receive input signals respectively representative of the current measured by the measuring means, of the thresholds and of the time delays, the first unit comprising means for determining a value representative of the rms value of the measured current, a second processing unit performing tripping functions depending on the rms value of the measured current, of the thresholds and of the time delays.

In state-of-the-art electronic trip devices, the tripping functions provide a circuit breaker opening order when at least a current flowing through a pole of the circuit breaker exceeds a preset current threshold for a time greater than that corresponding to the tripping curve. Among these functions, we can mention the long time delay function, or thermal function, and the short time delay function, or magnetic function.

The long time delay function has a threshold which corresponds to the circuit breaker setting current and a tripping time delay inversely proportional to the square of the fault current. The tripping curve is such that the product of the square of the fault current by the tripping time is equal to a constant value. Adjustment of the current threshold and time delay constant settings are generally accessible to the user. The short delay function has a higher threshold setting and a shorter time delay setting than those of the long delay. This time delay is either in constant time, or as for the long delay function in reverse time of the square of the fault current. These functions also have a so-called thermal memory which takes account of the past history of the trip device even if a fault of short duration has not given rise to tripping. Besides the main functions described above, electronic trip devices can comprise auxiliary functions such as ground fault protection or tripping in the event of overheating of the circuit breaker (monitoring of connections).

Other functions do not give rise to tripping such as current display, load-shedding or alarm contact control, or communication functions with peripheral equipment. The architecture of electronic trip devices generally follows a known model. Measuring of the current flowing in the main conductors and providing the trip device operating power are achieved by means of current transformers. They supply a secondary current of about 0.1 Amperes for rated operation. These secondary currents are shaped before being measured and processed by a tripping function processing unit. Electronic trip devices must operate at current levels much higher than the rated current. But it does happen that for certain circuit breaker ratings, the current transformers do not have a linear response over the whole measuring and protection range of the trip device These faults are due to saturation of the magnetic circuit of the transformers at a high current level and to a lack of magnetization at a very low current level. This lack of linearity was acceptable when the tripping functions operated with the peak value of the currents and the time delay and threshold precisions were fairly broad. In addition, the current responses of the transformers over a wide operating range are more degraded in rms value than in peak value. Certain state-of-the-art solutions enable this type of fault to be partially corrected. The document U.S. Pat. No. 4,695,961 notably describes, for a long time delay function, an operating mode in rms value up to a certain threshold and in peak value beyond this threshold. This solution has the shortcoming of not being homogeneous and continuous throughout the duration of the long delay function. Furthermore, the replacement peak value over the threshold is not corrected. The U.S. Pat. No. 4,870,532 proposes a device which varies the measurement impedance in terms of the current supplied by the current transformers. This solution applies to the peak or instantaneous values of the current and requires electronic power components capable of letting the current from the current transformers pass.

SUMMARY OF THE INVENTION

The object of the invention is to achieve an electronic trip device using the rms values, comprising correcting means guaranteeing tripping functions in compliance with the values of the primary currents flowing in the main poles of a circuit breaker.

According to the invention, the electronic trip device comprises means for determining correction parameters, and means for correcting at least one of the input signals of the first processing unit in terms of the correction parameters and of the value of the measured current, the correcting means supplying to the input of the second unit corrected values of the current, thresholds or time delays.

According to a development of the invention, the means for determining the correction parameters comprise means for storing the correction parameters.

In a preferred embodiment of the invention, it comprises means for storing a plurality of groups of parameters corresponding to a plurality of types of correction and means for selecting a group of parameters according to the type of circuit breaker.

According to a particular embodiment it comprises means for comparing the rms value of the measured current with preset correction thresholds, so as to define correction sectors, the means for determining the correction parameters supplying different parameters for each sector.

According to a development of the embodiment of the invention, the correction parameters constitute the coefficients (a,b,c) of a polynomial defining the corrected values in terms of the input signals.

According to a different embodiment of the invention the correcting means comprise amplifying means whose gain is variable in terms of the input signal.

The correcting means comprise, for example, a common input and output terminal connected to the input of the second processing unit, said terminal being connected by a first switch to the input of storing means, whose output is connected to the input of the amplifying means, and by a second switch to the output of the amplifying means, the correcting means comprising means for controlling the switches, so that one is open when the other is closed.

When the circuit breaker comprises a plurality of poles, the correction parameters can be modified according to the number of poles through which currents greater than preset thresholds are flowing.

To improve correction, it is possible to provide means for measuring the temperature, the correcting means correcting the input signals by means of correction parameters depending on said temperature.

BRIEF DESCRIPTION OF THE DRAWINGS

Other advantages and features will become more clearly apparent from the following description of a particular embodiments of the invention, given as non-restrictive examples only and represented in the accompanying drawings in which.

DETAILED DESCRIPTION OF THE PREFERRED EMBODIMENT

Figure 1:
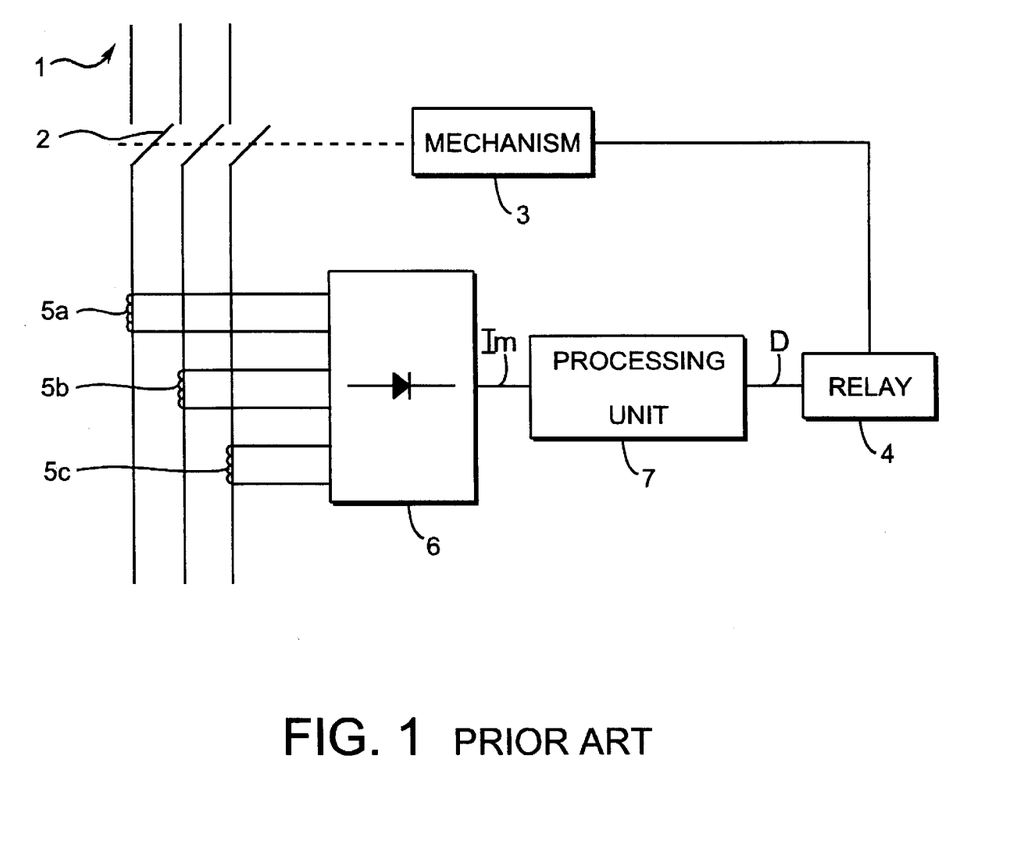
FIG. 1 represents a simplified block diagram of a circuit breaker in which a trip device comprising the invention can be implemented.

FIG. 1 represents the block diagram of a state-of-the-art circuit breaker. The electrical power system 1 to be protected is composed of electrical conductors. Contacts 2 enable the current in the power system 1 to be established or interrupted. Current transformers 5a, 5b, 5c, associated with the conductors of the power system 1 transform the primary currents of high intensity into secondary currents of low values compatible with electronic trip devices. These secondary currents are applied to the input of a shaping and measuring circuit 6. The latter supplies on output measured representative signals lm, which are applied to the input of an electronic processing unit 7. A tripping order D produced by the processing unit 7 is applied to the input of an operating relay 4 which actuates an opening mechanism 3 of the circuit breaker contacts 2.

Figure 2:
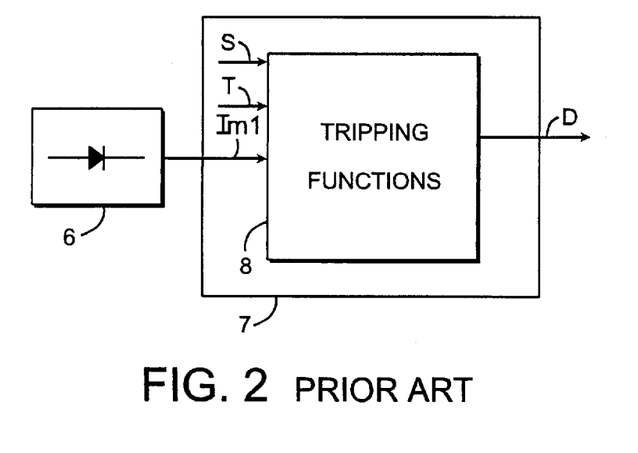
FIG. 2 represents a block diagram of an electronic trip device of state-of-the-art type.

In state-of-the-art trip devices, as represented by the block diagram of FIG. 2, a processing unit 8 receives from the tripping functions on the one hand the measured currents Im, and on the other hand setpoints corresponding to the current threshold values S and time delay constants T. The tripping time is a function of the measured currents, current thresholds and time delay constants.

Figure 3:
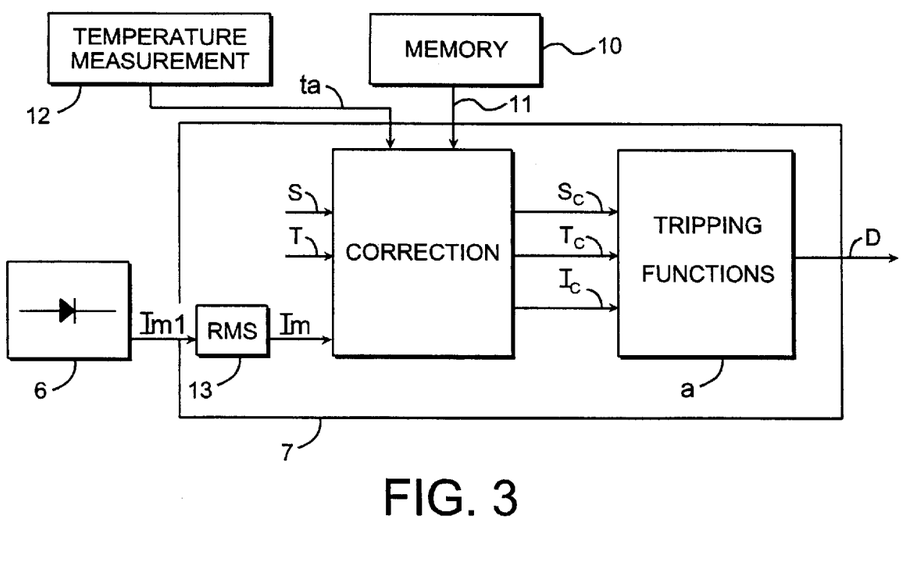
FIG. 3 represents a block diagram of an electronic trip device in which the invention is implemented.

According to the invention, the purpose of correction is to guarantee tripping functions in terms of tripping threshold and tripping time. The block diagram of a trip device comprising a correcting device is represented in FIG. 3. The unit 7 comprises a circuit 13 for computing the rms value Im of the measured current Im1. The correcting device 9 can transform the rms values of the measured currents Im into corrected currents Ic, the setting current thresholds S into corrected thresholds Sc, and the time delay constants T into corrected time delay constants Tc. Correction can be performed either on one of these elements or on several of them at the same time, and can be different according to the tripping function.

For example, for a long delay function, correction can consist in supplying only a corrected current Ic in terms of the rms value of the measured current Im. For a short delay function on the other hand, only the tripping threshold Sc can be modified in terms of the value of its initial threshold S and of the rms current Im. The functions which use reverse time delays, in which the product of the square of the current over time is equal to a constant, can be corrected by modifying the time constant T in terms of the current Im.

This correcting device enables homogeneous operation of the tripping function processing unit 8 to be achieved, the corrected values Sc, Tc, Ic being substituted directly for the initial values S, T, Im. For the corrections to be efficient, they must be adapted to each type of circuit breaker and to each current transformer rating. According to a preferred embodiment of the invention, this adaptation is performed by means of a device 10 for storing the correction parameters 11, these parameters being previously determined from the curves obtained when testing is carried out.

The operating temperature modifies the current response of the transformers. In state-of-the-art manner, some circuit breakers have a measurement of the internal temperature of the circuit breaker bringing about tripping when the temperature rise exceeds a preset threshold. A device 12 for measuring the internal temperature of the circuit breaker supplies the measured value ta to the device 9, and can participate in correction of the currents, thresholds or time delay constants. For example, when the temperature exceeds a certain threshold, a preset correcting factor is applied to the thresholds S or time delays T so as to reduce them. A correcting factor can also be applied directly to the current so as to increase it.

Figure 4:
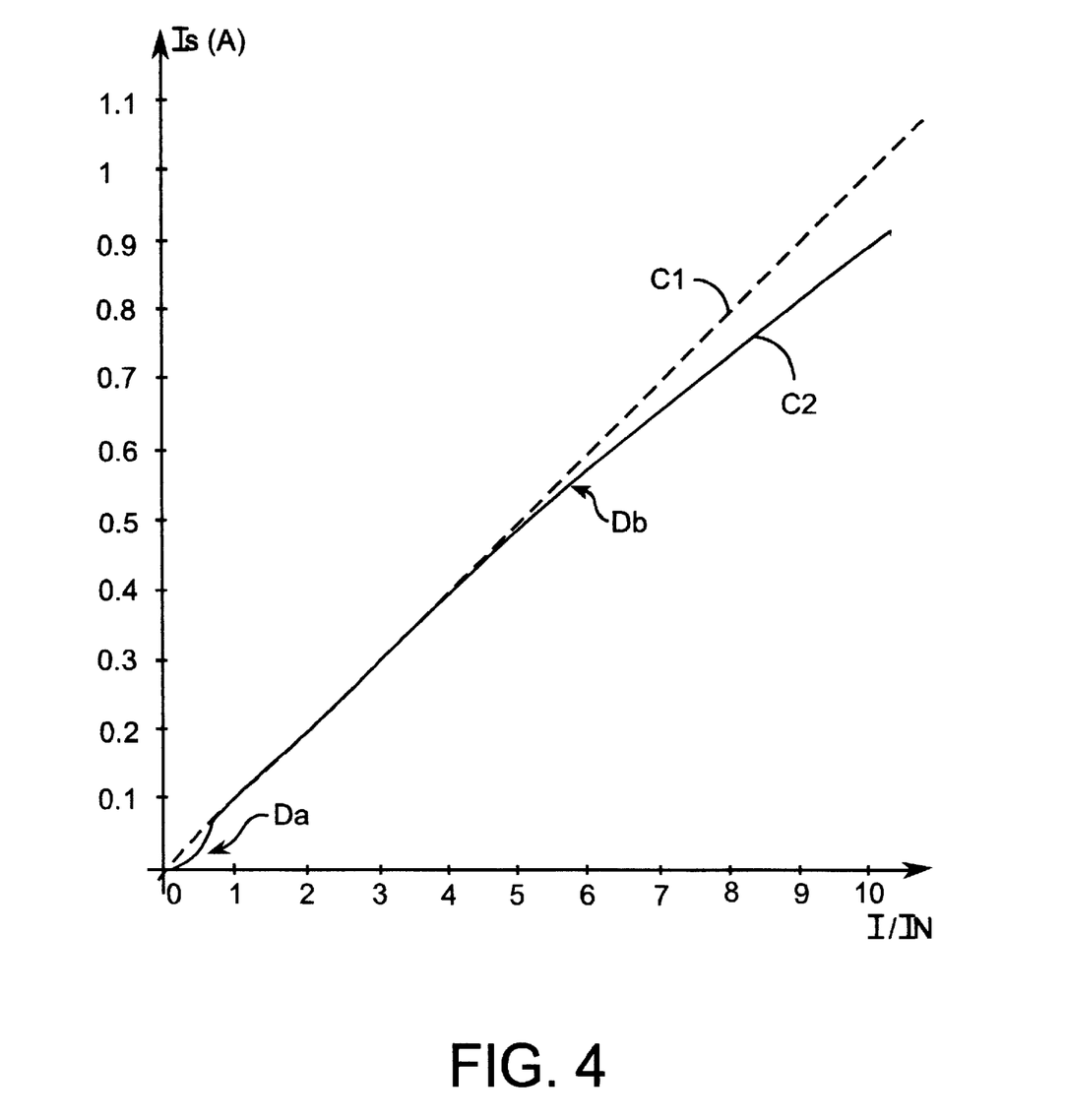
FIG. 4 represents the response curve of a current transformer presenting linearity faults.
Figure 5:
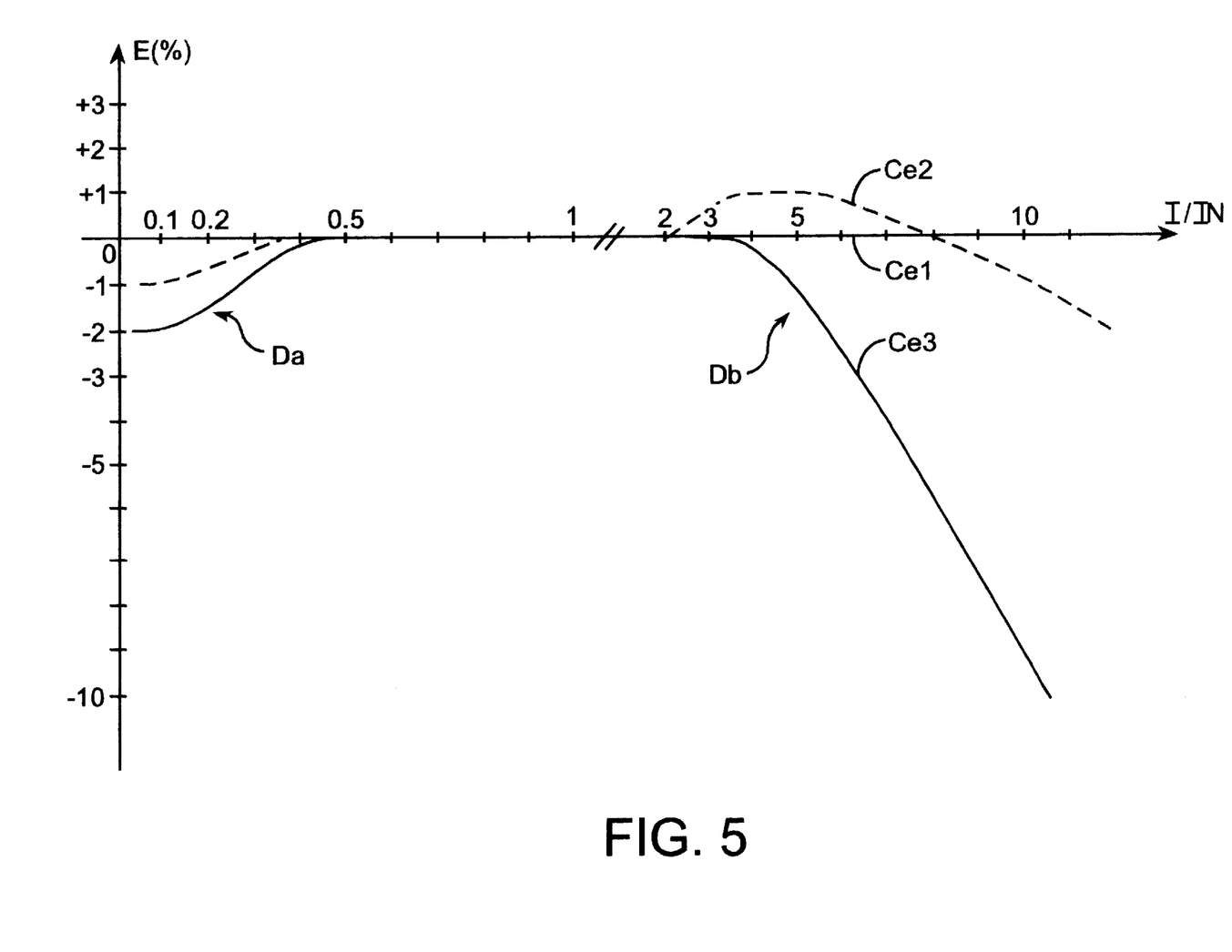
FIG. 5 gives a representation in percentage of the errors produced by the non-linearities of the current transformers.

A response curve C2 of the secondary current Is of a current transformer is represented in FIG. 4. For a primary current I equal to the rated current IN of the circuit breaker, the secondary current is equal to 0.1A. The curve C2 presents two attenuation zones Da and Db with respect to a theoretical curve C1. The first deformation zone Da appears for low current values. These deformations are essentially caused by low magnetization of the magnetic circuit of the current transformers, and by the low voltage generated on the secondary winding making the current Is very sensitive to load changes. The second deformation zone Db is situated for high current values. These deformations are essentially due to saturation of the magnetic circuit of the current transformers. Another representation of the response of the transformers is given in FIG. 5. It expresses the error E in percentage with respect to an ideal curve Ce1. Certain response curves, notably in peak values, Ce2, can have zones higher than the ideal curve Ce1, whereas for responses in rms values, Ce3, the negative errors are greatly accentuated.

Figure 6:
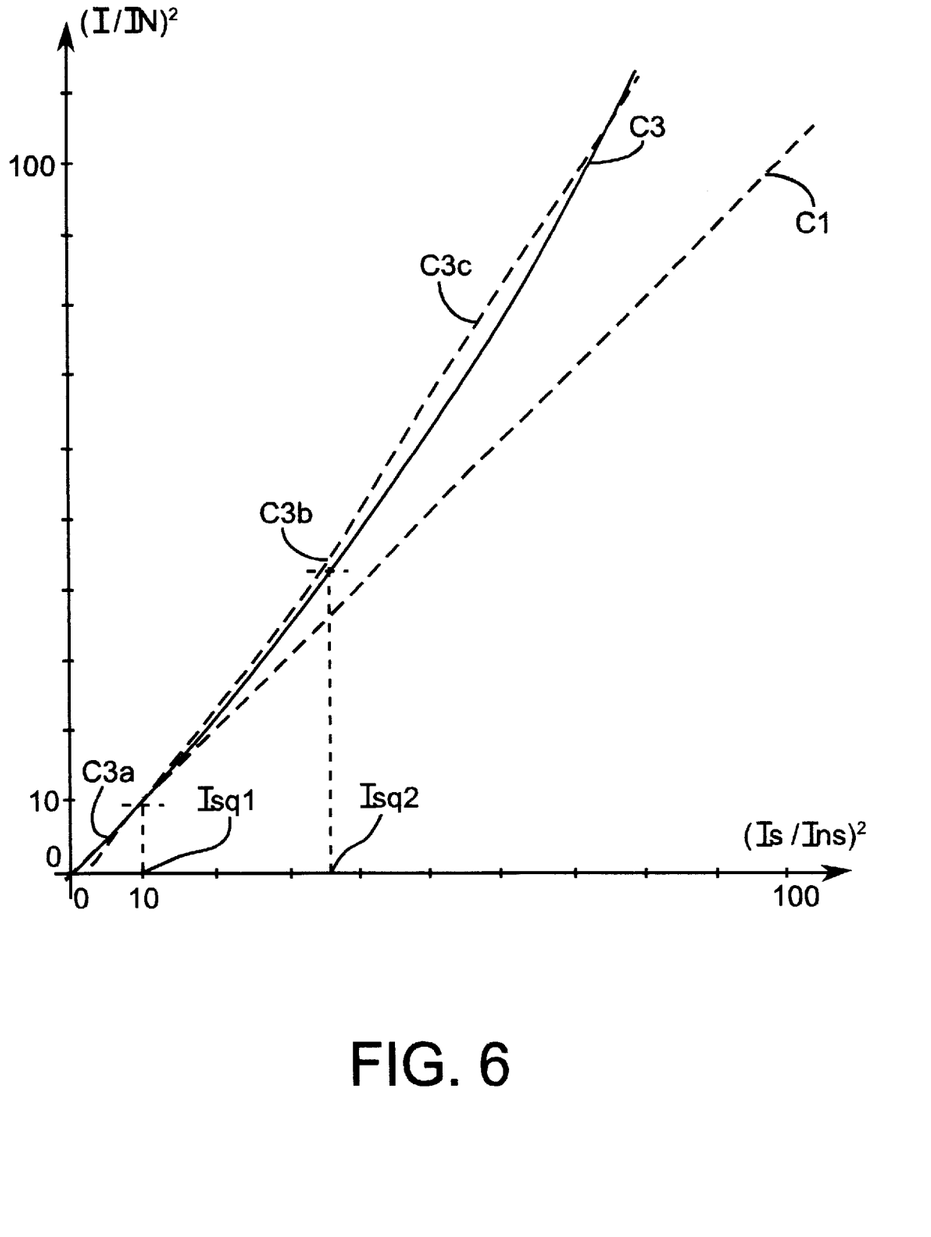
FIG. 6 represents non-linearity curves in terms of the currents raised to the square and of the correction sectors.

The tripping functions often need the current value raised to the square, notably the long delay function for the reverse time tripping curve. It is then preferable to perform correction directly on the current value raised to the square. FIG. 6 shows a non-linearity curve C3 representing the square of the ratio of the primary current I and of the rated current In in terms of the square of the ratio of the secondary current Is and of the rated secondary current Ins. The axes have been inverted with respect to FIGS. 4 and 5 to enable analysis with respect to the secondary current. According to a particular embodiment, correction is performed by sectors, the object being to bring the value of the square of the current of curve C3 as close as possible to the ideal curve C1. To determine the correction parameters, the curve C3 was modeled during the tests in three straight sectors: C3a if the value of $(Is/Ins)^2$ is lower than a first threshold Isq1, C3b if the value of $(Is/Ins)^2$ is comprised between a first threshold Isq1 and a second threshold Isq2, and C3c if the value of $(Is/Ins)^2$ is greater than the second threshold Isq2. Within each sector, the correction parameters were determined so as to adjust the corresponding curve C3a, C3b or C3c to the curve C1. In each sector correction will be of the form:

$$(Ic)^2 = An + Bn(Im)^2,$$

where An represents a constant and Bn a coefficient of proportionality. An and Bn are part of the correction parameters 11 supplied by the storing device 10.

Figure 7:
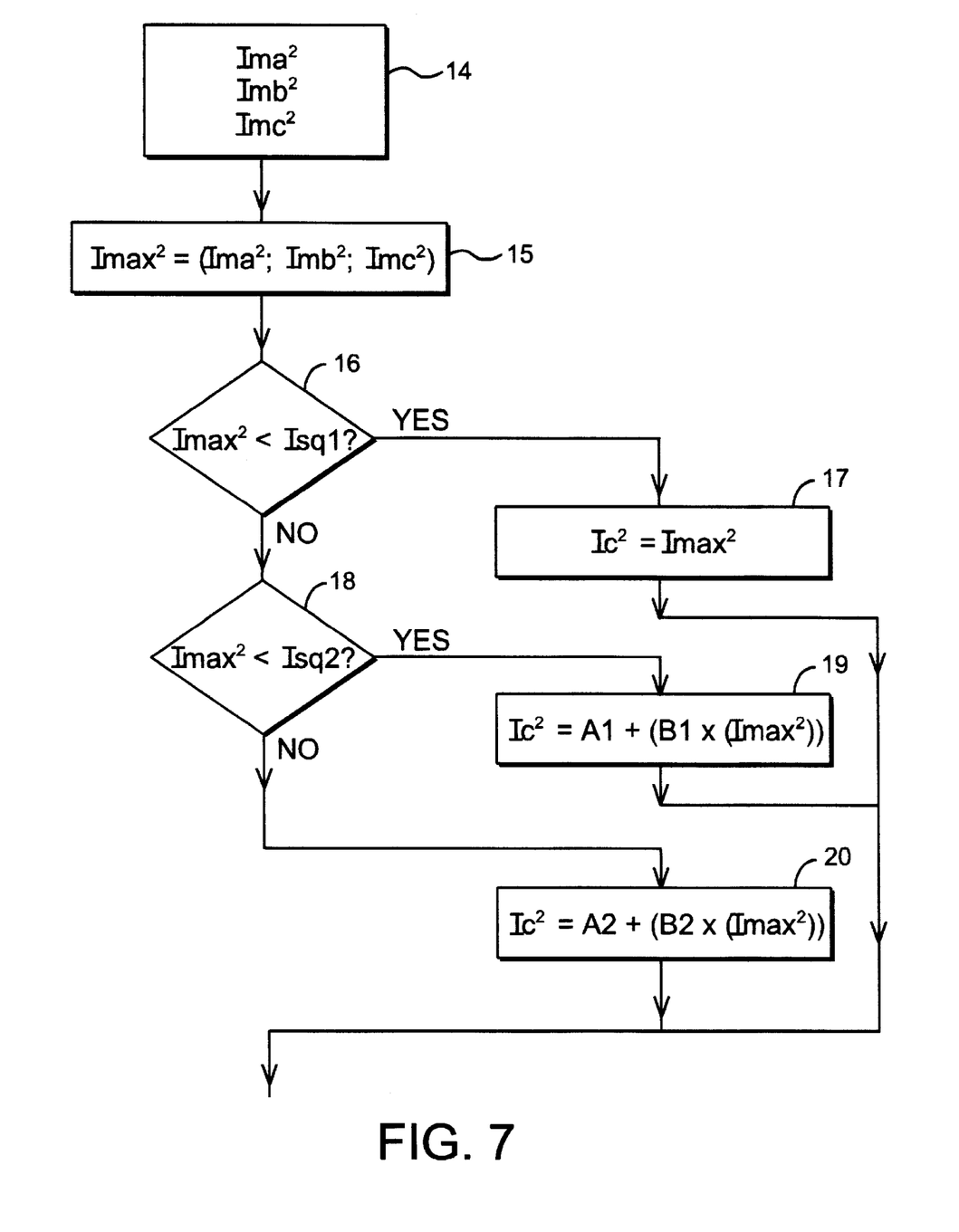
FIG. 7 shows a flow chart for processing of a correction corresponding to the curves in FIG. 6.

A flow chart of an embodiment in digital technology is represented in FIG. 7. The values of $Ima^2$, $Imb^2$, $Imc^2$ are representative of the rms values of the secondary currents measured by the current transformers 5a, 5b, 5c. Acquisition of these rms values is performed at stage 14.

In the embodiment represented, the tripping function uses the maximum value of the currents, detection of the maximum current is performed at stage 15. The value $Imax^2$ is the maximum value among the values $Ima^2$, $Imb^2$, $Imc^2$. $Imax^2$ having been determined, processing of correction by sector can be performed. The comparison 16 between $Imax^2$ and the first threshold Isq1 directs the processing to stage 17 if $Imax^2$ is lower than Isq1. In this case, the corrected value $Ic^2$ is equal to the initial value $Imax^2$. If not the processing is directed to stage 18 where $Imax^2$ is compared with the second threshold Isq2. If $Imax^2$ is then lower than the second threshold Isq2, the processing is directed to stage 19. The corrected value $Ic^2$ is then equal to the sum of the constant A1 and of the product of the correction coefficient B1 and of the value $Imax^2$. In the opposite case, the value of $Imax^2$ is greater than he second threshold Isq2 and directs the processing to stage 20. Correction is performed in the same way as for stage 19, but the parameters are different, being the constant and B2 the correction coefficient. For example to correct the curve C3 represented in FIG. 6, the parameters used are:

$$A1=-1.99;\ B1=1.3;\ A2=-16.3;\ B2=1.7$$

Correction is not limited to the embodiment illustrated above and can be performed in a polygonal form by sectors or in integral manner on all the values of Im or of $Imax^2$. The corrected value $Ic^2$ can be written for example:

$$Ic^2 = a + b(Imax^2) + c(Imax^2)^2$$

where a, b, c are correction parameters determined from curves plotted during testing.

Another embodiment can use analog techniques. The corrections are then made with operational amplifiers or comparators. The correcting device can then be serially connected in the processing channel or, notably when one wishes to avoid modifying a pre-existing analog circuit, branch connected as in the diagram in FIG. 8. In this embodiment, the current value is corrected before processing by the tripping function processing circuit 27. The circuit 22 corresponds to an architecture of a state-of-the-art trip device, achieved for example in the form of an integrated circuit or hybrid circuit. In the particular embodiment represented, the current Is of one of the current transformers passes through a measuring resistor RM. The voltage generated on RM is filtered by a resistor R1 and a capacitor C1 so as to present on input terminals 29 and 30 of the circuit 22 a voltage representative of the rms value of the current Is. An amplifier AO1 adapts this input voltage to apply it to a maximum detector 23 compared, in state-of-the-art manner, by an amplifier AO2 formed by an operational amplifier A whose non-inverting input is connected to the output of the amplifier AO1, whose output is connected to the anode of a diode D2, and whose inverting input is connected to the cathode of the diode D2 which constitutes the output of the detector. The output of the detector 23 is directly connected to the input of the tripping function processing device 27. The correcting device 9A is directly connected to the output of the detector 23 by means of a terminal 28. Connection is made by means of two switches SW1 and SW2 controlled by a control circuit 31 and operating alternately. When SW1 is closed and SW2 open, the value of the output voltage Vin of the detector 23 is stored by a peak detector 24 comprising, like the detector 23, an amplifier AO3 and a diode D1, and comprising in addition a circuit R2, C2 having a high time constant comprising a parallel-mounted resistor and capacitor connected between the output of the peak detector and ground. The stored voltage VB obtained at the output of the, peak detector 24 is applied to the input of two correction circuits 25 and 26 whose outputs are connected and supply an output voltage VC. The first circuit 25 performs a direct transfer without amplification of the voltage VB. In the figure, the circuit 25 is a maximum detector of the same type as the detector 23, comprising an amplifier AO4 and a diode D3. If the input voltage Vb of the circuit 25 is greater than VC, then VC takes the value of Vb otherwise Vc keeps its value. The second circuit 26 performs amplification of Vb if its value is greater than a reference threshold Vref. The circuit 26 is also formed by a maximum detector but with amplification. It comprises an amplifier AO5 and diode D4 connected in the same way as AO2 and D2. Resistors R3, R4, R5 and R6 determine the amplification value. The resistor R3 is connected between the non-inverting input d of the amplifier AO5 and the reference voltage Vref. The resistor R4 is fitted in the connection between the non-inverting input of the amplifier AO5 and the output of the circuit 26. The resistor R5 is fitted between the output of the circuit 24 and the non-inverting input of the amplifier -AO5 and the resistor R6 grounds this non-inverting input. If VB is greater than Vref, the voltage Vc corresponds to the value of Vb amplified by the circuit 26. For this corrected value of Vc to be reapplied to the trip device processing channel via the terminal 28, the switch SW1 opens and the switch SW2 closes. Detection of the maximum values between the outputs of the circuits 23, 25, 26 then takes place. So long as the value of Vin is lower than the threshold Vref, direct transfer takes place and when Vin becomes greater than Vref, correction by amplification takes place.

Figure 8:
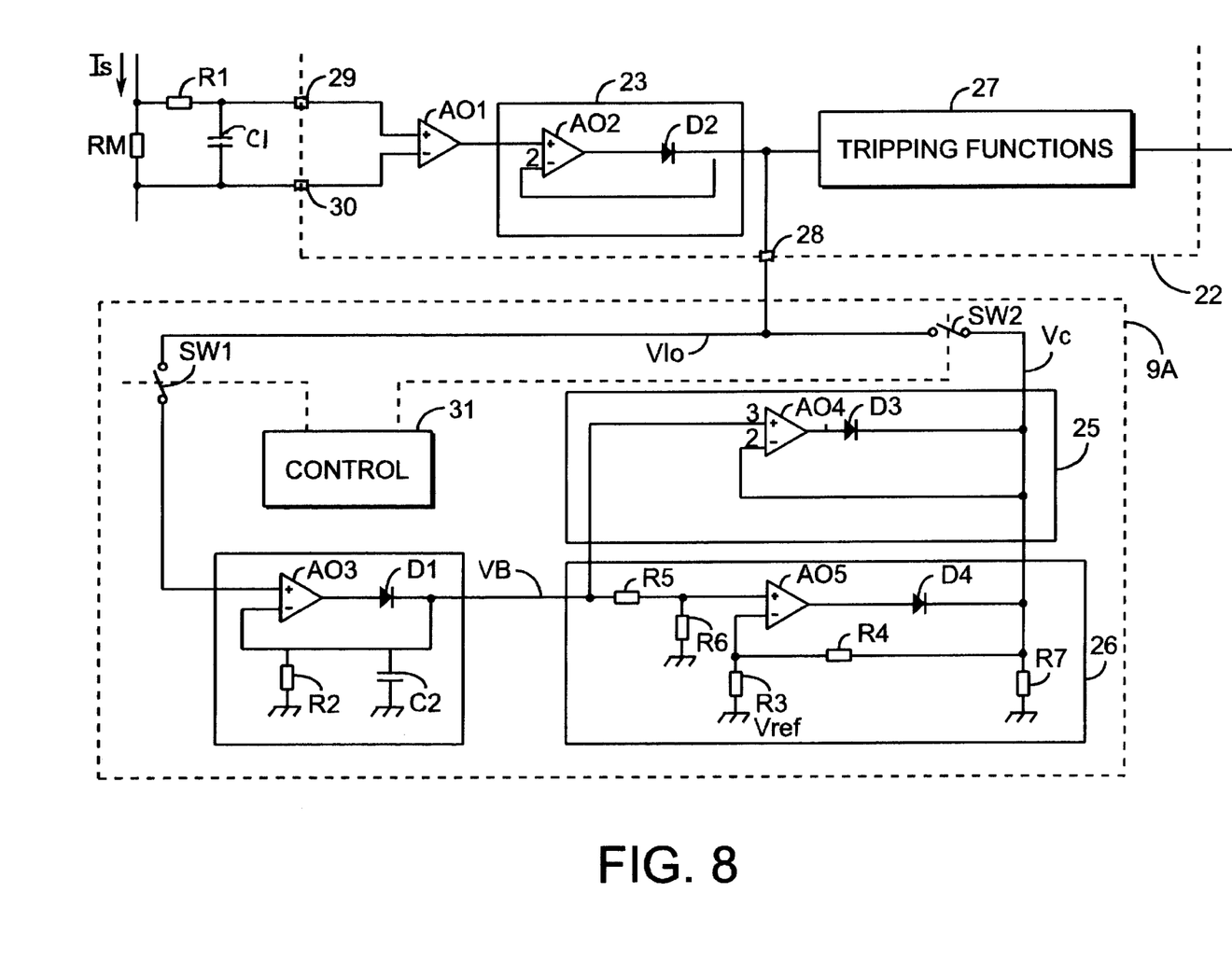
FIG. 8 shows a diagram of an analog embodiment of the invention.

For satisfactory operation of the correcting device, the time period corresponding to the closed state for SW1 and open state for SW2 must be smaller than the time period corresponding to the open state for SW1 and closed state for SW2. A circuit 26 enables correction of a sector to be performed. Parallel connection, Vb for the input and Vc for the output, of several circuits 26 having different Vref values and different values of resistors R3 to R6 enables several sectors to be suitably corrected.

The correcting devices described above are suitable for electronic trip devices using digital and analog technology. Correction can be performed at several levels, notably individually on the currents of each transformer, grouped on the maximum current, or on the maximum value raised to the square. For digital technology trip devices, notably when the circuits 8, 9 and 13 comprise a microprocessor, parameter storing can be performed by means of an auxiliary configuration memory. In another embodiment, the parameters corresponding to all the types of correction corresponding to various types of transformers recorded, can be stored in the central memory of the trip device and selection of the type of correction can be performed when the rating is read in the auxiliary memory. Other embodiments of parameter selection can be implemented notably by measuring different voltages, measuring resistances, or reading different positions of switches which can be selected. The response of the current transformers is different according to the configuration of the currents flowing through the circuit breaker. For example very strong currents passing through two adjacent poles of a circuit breaker lead to greater non-linearities than if a high current is flowing through a single pole. According to a development, the correcting device can modify the correction parameters in terms of the number of circuit breaker poles in which currents greater than preset thresholds are flowing.

We claim:

1. An electronic trip device comprising:
    measuring means for measuring the current flowing in conductors to be protected by an electrical circuit breaker associated with the trip device; and
    a processing unit, connected to said measuring means, for receiving signals representative of the current measured by said measuring means and generating a tripping signal;
    wherein said processing unit includes first determining means for supplying a signal representative of the RMS value of the current measured by said measuring means, second determining means for supplying signals representative of thresholds and time delays, and third determining means for supplying correction parameters,
    correction means, including inputs connected to said first, second and third determining means, for correcting at least one of the signals, representative of the RMS current value, the thresholds and the time delays, supplied by the first and second determining means in terms of the correction parameters supplied by the third determining means and the value of the measured current, and
    a tripping function processing unit, connected to an output of said correction means, for performing tripping functions based on the signals corrected by the correction means.

2. The trip device according to claim 1, wherein the third determining means comprise memory means for storing the correction parameters.

3. The trip device according to claim 2, wherein said memory means comprises means for storing a plurality of groups of parameters corresponding to a plurality of types of correction and means for selecting a group of parameters according to the type of circuit breaker protecting the conductors.

4. The trip device according to claim 1, further comprising means for comparing the rms value of the measured current with preset correction thresholds, so as to define correction sectors, wherein said third determining means supplies different parameters for each sector.

5. The trip device according to claim 1, wherein the correction parameters constitute the coefficients of a polynomial defining the corrected values in terms of the input signals.

6. The trip device according to claim 1, wherein the input signal representative of the rms value of the measured current is proportional to the square of said rms value.

7. The trip device according to claim 1, wherein the circuit breaker includes a plurality of poles, and the correction parameters are modified according to the number of poles through which currents greater than preset thresholds are flowing.

8. The trip device according to claim 1, further comprising temperature measurement means for measuring temperature, wherein an output of the temperature measurement means is connected to an input of the correction means.

9. The trip device according to claim 1, wherein the correction means comprises amplifying means having an input connected to an output of the first determining means and an output connected to an input of the tripping function processing unit, the gain of said amplifying means being variable.

10. An electronic trip device comprising:
    measuring means for measuring the current flowing in conductors to be protected by an electrical circuit breaker associated with the trip device; and
    a processing unit, connected to said measuring means, for receiving signals representative of the current measured by said measuring means and generating a tripping signal;
    wherein said processing unit includes first determining means for supplying a signal representative of the RMS value of the current measured by said measuring means, second determining means for supplying signals representative of thresholds and time delays, and third determining means for supplying correction parameters,
    correction means, including inputs connected to said first, second and third determining means, for correcting at least one of the signals, representative of the RMS current value, the thresholds and the time delays, supplied by the first and second determining means in terms of the correction parameters supplied by the third determining means and the value of the measured current, and
    a tripping function processing unit, connected to an output of said correction means, for performing tripping functions based on the signals corrected by the correction means;
    wherein the correction means comprises a common input and output terminal connected to the input of the trip function processing unit, said terminal being connected by a first switch to an input of a storing means, whose output is connected to an input of an amplifying means, and by a second switch to an output of said amplifying means, the correction means comprising means for controlling the switches, so that one is open when the other is closed.

* * * * *